Dec. 13, 1966  S. SCHALKOWSKY  3,291,995
PHOTOELECTRICALLY CONTROLLED RADIATION PRESSURE TORQUE BALANCE
Filed Feb. 17, 1964  2 Sheets-Sheet 2

INVENTOR.
SAMUEL SCHALKOWSKY
BY
Walter B. Udell
ATTORNEY

United States Patent Office 3,291,995
Patented Dec. 13, 1966

3,291,995
PHOTOELECTRICALLY CONTROLLED RADIA-
TION PRESSURE TORQUE BALANCE
Samuel Schalkowsky, Radnor, Pa.
(4003 Woodlawn Road, Chevy Chase, Md. 20015)
Filed Feb. 17, 1964, Ser. No. 345,465
18 Claims. (Cl. 250—231)

This invention relates generally to torque measurement apparatus, and more particularly relates to devices for measuring very low level forces of any kind by generating a radiation pressure controlled restoring force resulting in a torque balance.

The apparatus according to the invention is capable of measuring pressures on the order of $10^{-6}$ dynes/cm.$^2$ and lower, a region in which heretofore there has existed a substantial degree of uncertainty as to the accuracy of measurements because of error forces introduced by various aspects of the measuring devices themselves. One application of such a device is in the measurement of the momentum contained in molecular beams, or in the energy measurement of a laser beam. Another application of present importance, and one which will be of increasing importance in the future, is as an extremely low pressure gauge in the range of $10^{-7}$ Torr and lower where the present ability to produce extremely high vacuums has outdistanced the present ability to measure the same with any substantial degree of accuracy.

In the past, low gas pressures have been measured by instruments of the type known as speed decay drag gauges. Such drag gauges utilize a freely movable surface, as for example the cylindrical outer surface of a cylinder mounted for rotation about the cylindrical axis in which the cylinder itself is set into axial spin by an externally applied force. The momentum is transferred to gas molecules impinging upon the cylinder so that with the external cylindrical drive disconnected the loss of momentum to the gas molecules causes the cylinder to slow down. Measurement of the speed decay of the cylinder provides a measurement of the gas pressure to which the spinning cylinder is subjected.

The radiation pressure controlled devices according to the present invention utilize a sensor device having a target subjected to molecular flow of the gas environment which it is desired to measure, the target being so arranged as to cause rotation of the sensor as a consequence of the molecular bombardment. A rotational counter-force or restoring torque for balancing out the effect of the molecular bombardment of the target is generated by directing a beam of radiation from an external source upon a suitably arranged surface of the sensor. The pressure due to this radiation depends upon the energy per unit volume in the beam, and reasonable light intensities produce countertorques comparable to the torque due to molecular interactions of a rarefied gas. The production, control and measurement of torques in the range of interest, namely in the micro-dyne-centimeter range, involves the control and measurement of energy fluxes on the order of watts, which poses no problem.

The radiation pressure controlled torque balance gauge devices according to the present invention are superior to the speed decay drag gauges previously known for several reasons. As a first matter, the gauge according to the invention is considerably less sensitive to shock and vibration than is the speed decay drag gauge, and thus finds a much larger range of application. Additionally, the gauge according to the invention indicates pressure on a continuous basis and therefore gives an indication of the occurrence of transient conditions, whereas in the drag gauge such transients are averaged into the final result without any indication of the occurrence thereof. Moreover, the speed decay drag gauge is dependent upon the gas constitution and therefore requires the use of a mass spectrometer or its equivalent for determination of the gas pressure being measured. The gauge according to the invention being independent of the gas constitution is much simpler to instrument and is therefore of relatively simple construction as compared with the drag gauge. Accordingly, it is a primary object of this invention to provide a radiation pressure controlled torque balance gauge capable of measuring very low level forces of any kind by generating a radiation pressure controlled force effective to balance out a torque exerted on a sensing device by the force being measured.

Another object of this invention is to provide a novel radiation pressure controlled torque balance gauge as aforesaid utilizing a rotatable sensor and supporting circuity associated therewith effective to control the quanta of radiation delivered to the sensor for purposes of producing a control torque in accordance with the degree of rotation of the sensor produced by the force being measured.

Still another object of this invention is to provide a radiation pressure control torque balance gauge as aforesaid wherein the rate of radiation input to the gauge sensor is controlled not only by the degree of rotation of the sensor from a preset reference, but also by the rate of change of sensor rotation so that motion of the sensor is damped, and any tendency toward hunting is sharply curtailed.

A further object of this invention is to provide a novel radiation pressure controlled torque balance gauge as aforesaid wherein the control torque may be modulated in a variety of ways, including the control of the radiation intensity level and the application of differential torques to the rotating system.

The foregoing and other objects of the invention will become clear from a reading of the following specification in conjunction with an examination of the appended figures, wherein:

FIGURE 3 illustrates a gauge according to the invention utilizing a cylindrical sensor and apparatus for providing a magnetic suspension therefor;

FIGURE 4 is a perspective view of a sensor element in the form of a cylinder having a vane turned thereout of such as is utilized in the radiometer type of sensing system illustrated in the showing of FIGURE 2.

In the several figures, like elements are denoted by like reference characters.

Figure 1:
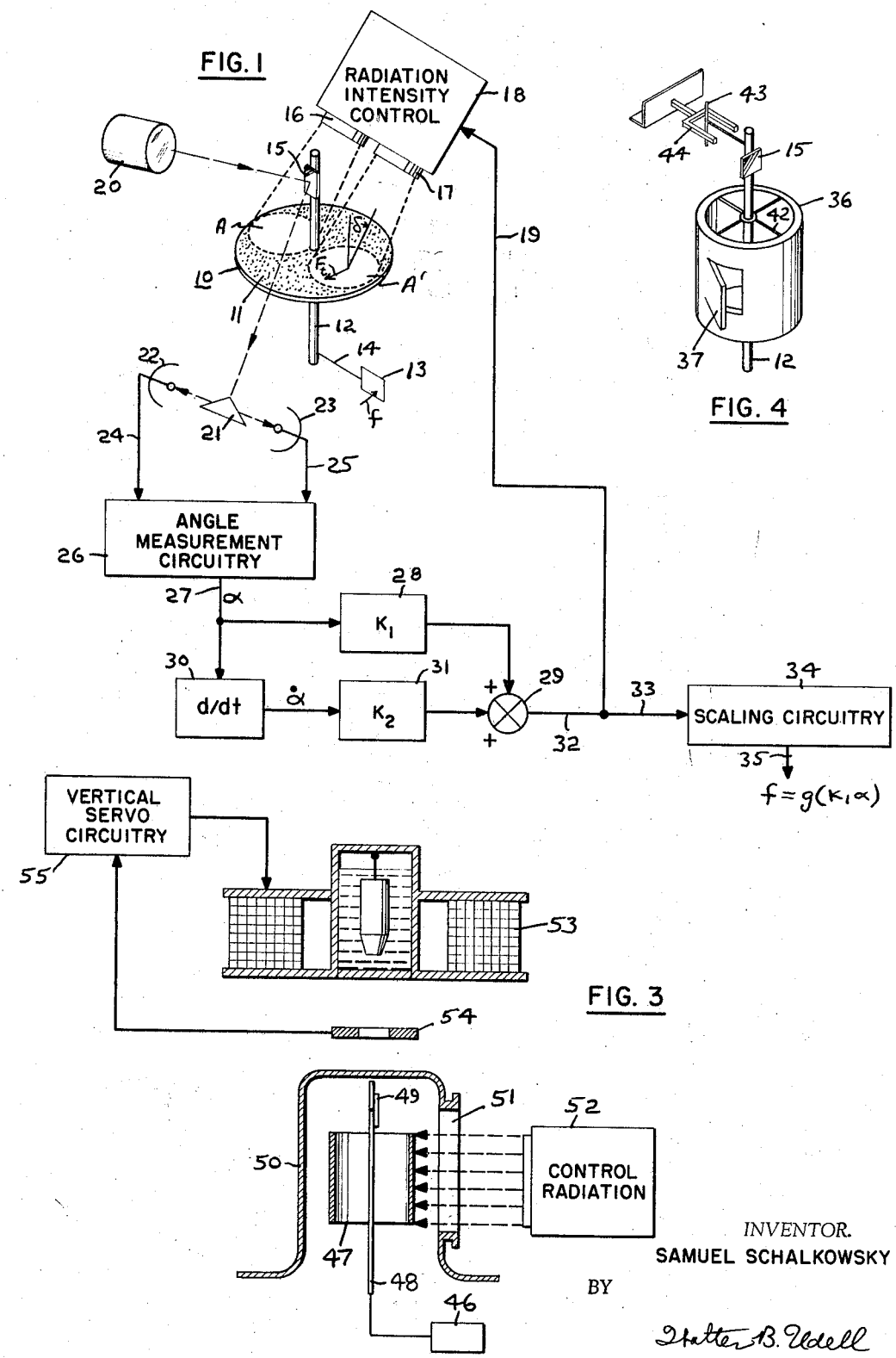
FIGURE 1 illustrates one possible form of instrumentation of the radiation pressure controlled torque balance gauge according to the invention, utilizing two sources of radiation controllable in a differential manner.

Turning now to the figures, consider first the system showing of FIGURE 1 which essentially includes a sensing device and a monitor and control system. The sensing device includes the circular disc 10 coated on its upper surface with a highly radiation absorbent coating 11, such as Parsons black, a ferrite rod 12 fixedly secured to and passing perpendicularly centrally through the circular disc 10, and a target 13 secured to the ferrite rod 12 as by means of a rigid wire 14 so that the target is at a suitable distance from the ferrite rod 12 and therefore able to develop a reasonable magnitude of torque when subjected to the relatively small forces thereon. Fixedly secured to the upper end of the ferrite rod 12 is a mirror 15 which is not part of the sensor structure, but which is required as part of the monitor and control system of the device for indicating angular rotation of the disc 10 from a predetermined reference point.

Focused upon the absorbent upper surface 11 of the circular disc 10 and producing areas of illumination A and A' thereon are light sources 16 and 17 which have their radiation intensity controlled by control device 18 in accordance with control signals appearing on line 19. In the absence of any control signals on the control line 19, the radiation intensity control 18 causes the light sources 16 and 17 to produce light beams of equal intensity. Since the light beams are of equal intensity and are focused to cover equal areas A and A' which lie exactly diametrically across the disc 1 from one another, the torque on the disc 10 produced by the radiation pressure of the illumination A and A' has a net value of zero and no rotation of the disc 10 about the axis passing centrally through the ferrite rod 12 occurs. Such a condition will exist when the target 13 has no force whatever directed against it.

This quiescent or zero signal state corresponds to that in which light directed at the mirror 15 from the collimated light source 20 strikes the beam splitter 21 in such manner that equal amounts of light are directed by the beam splitter 21 to the photocell devices 22 and 23. The signal outputs from the photocells 22 and 23 are carried by conductors 24 and 25 to the input circuits of the angle measurement circuitry 26, such circuitry itself being basically a D.C. differential amplifier. Since the light input to the photocells 22 and 23 is equal, the net signal developed at the output 27 of the angle measurement circuitry is zero and corresponds to an angular rotation $\alpha$ of the disc 10 of zero degrees from the reference point.

Assuming now that the target 13 is subjected to a small force $f$ as shown in FIGURE 1, the disc 10 and ferrite rod 12 will begin to rotate in a counterclockwise sense. Such rotation of course causes the mirror 15 which is secured to the ferrite rod 12 to also rotate and direct more of the light from the collimated light source 20 to that side of the beam splitter 21 which will cause more light to be reflected into photocell 23 and less light to be reflected into photocell 22. The signal outputs on the conductor lines 24 and 25 from the photocells are thus different, the signal on line 25 being larger than that on line 24. Consequently, an $\alpha$ signal is generated on the output line 27 of the angle measurement circuitry 26 having both magnitude and sense. For example, the sign of the $\alpha$ signal could be plus under the stated conditions with reference to a datum, while the $\alpha$ signal would be negative in the reverse situation where the signal on line 24 were greater than that on line 25.

The output signal $\alpha$ passes through a scaling device 28 and is then routed to one input of an adder 29 as a signal $K_1\alpha$. The angular output signal $\alpha$ is also passed through a differentiator 30 after which the differentiated output is appropriately scaled by the device 31 and the output $K_2\dot\alpha$ is injected into the second input of the adder 29. The adder output appearing on line 32 therefore includes a component proportional to the angular deviation of the disc 10 from its zero reference position and also includes a component which is proportional to the rate of change of the angle $\alpha$. The composite signal is transmitted to the radiation intensity control 18 via signal line 19 and causes the intensity of light source 17 to increase while simultaneously causing the intensity of light source 16 to decrease, thus producing a net torque exerted in a clockwise rotational sense upon the disc 10, such torque being observed to be counter to that exerted on the target 13 by the previously mentioned force $f$.

The radiation intensity control 18 could typically be a differential amplifier which directly controls the energization of the light sources or indirectly does so, as for example by controlling the conduction angles of a pair of controlled rectifiers which latter each controlled one of the light sources 16 and 17. The scaling devices 28 and 31 may be simple potentiometer devices while the adder 29 may consist of a pair of electron tubes having independent grid inputs with a common plate or cathode load. The scaling devices 28 and 31 are adjusted relatively to one another to provide a proper balance in the composite control signal.

As the light sources 16 and 17 adjust their intensity levels to slow and finally stop the rotation of the disc 10, the angular differentiated output of differentiator 30 decreases until the disc has completely stopped, at which point the differentiated output $\dot\alpha$ will be zero. Therefore, when the disc 10 has arrived at a stabilized position in which the torque exerted by the force $f$ on target 13 is exactly balanced by the radiation torque generated by the controlled light sources 16 and 17, the mirror 15 will be motionless and the angle measurement circuitry 26 will be motionless and the angle measurement circuitry 26 will be producing a fixed signal on its output line 27. The signal thus appearing on signal line 19 is equal to $K_1\alpha$ and is likewise constant. This same signal of course appears on input line 33 to the scaling circuitry 34, which latter produces an output on line 35 indicating the magnitude of the force $f$. The signal on output line 35 may of course be utilized to deflect a meter or operate a digital display or give some other particular type of readout.

With respect to the disc sensor of FIGURE 1, it can be shown that the radiation from the light sources impinging thereon produces a tangential component of force $F_t$ which will produce a rotational torque on the disc 10 about the axis extending centrally longitudinally through the ferrite rod 12, and will also produce a force normal to the disc which acts parallel to the axis of rotation and which will therefore produce no torque about such axis. It can be shown that the rotational torque on the disc 10 produced by each of the light sources 16 and 17 is given by the expression:

$$\tau_D = \frac{\pi r^3 S}{16c}(R_A + R_D) \sin 2\delta \qquad (1)$$

Where

S is the energy density of incident radiation in ergs/cm.$^2$-sec.
$c$ is the speed of light, 2.998 times $10^{10}$ cm./sec.
$R_A$ is the coefficient of absorption of the surface 11.
$R_D$ is the coefficient of diffuse reflection of the disc surface 11.
$\delta$ is the angle between the incident radiation beam and the normal to the surface 11 of the disc 10.
$r$ is the radius of the disc 10.

The net torque on the disc 10 which is produced by the differential action of the two light sources 16 and 17 is given by the following:

$$\tau_{DN} = \frac{\pi r^3}{16c}(R_A + R_D)(S_{17} - S_{16}) \sin 2\delta \qquad (2)$$

From the above equations it will be observed that when the radiation is directed at the disc 10 at an angle of 45°, then $2\delta$ equal 90° and the sin $2\delta$ equal unity and disappears from the equation. In the event that the absorbing coating 11 on the disc 10 is Parsons black or a similar substance, then the coefficient of absorption $R_A$ is approximately equal to .96 and the coefficient of diffuse reflection may be approximately .02, so that the expression $(R_A + R_D)$ is approximate to .98 and is also very close to unity.

Figure 2:
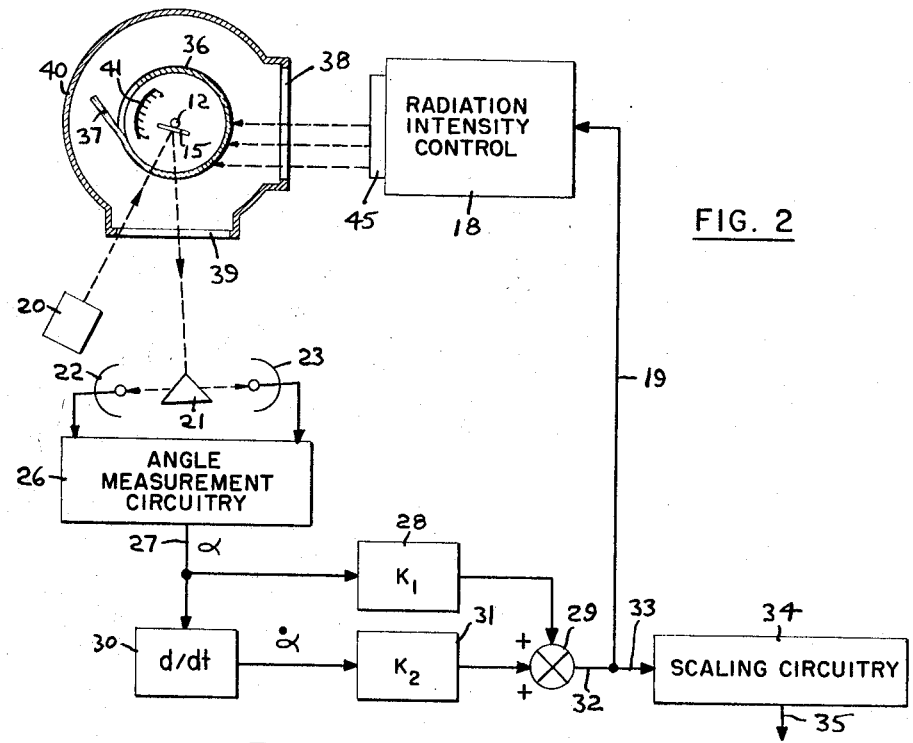
FIGURE 2 illustrates another form of the invention, differing from that of FIGURE 1 in that a single source of radiation is utilized in conjunction with a sensor responsive to radiometer pressure developed by the molecules of a low pressure gas.

Referring now to FIGURE 2 it is observed that all of the monitor and control circuitry of FIGURE 1 is also present in FIGURE 2 with these particular elements being designated by the same reference characters. The basic difference between FIGURES 1 and 2 is that the disc 10 of FIGURE 1 and its target 13 have been replaced by a cylinder 36 having a vane 37 turned out of the cylindrical side wall. This cylindrical structure is shown in perspective in the showing of FIGURE 4 to which reference should also be made. The entire sensor structure is contained within an enclosure having transparent windows 38 and 39 and a thermally conductive shell 40. Disposed within the cylinder 36 is a concentric cylindrical surface 41 heatable as for example by means of an electrical resistance element to a closely controlled temperature. The thermally conductive shell 40 is maintained at a fixed temperature lower than the heatable surface 41 so that a net temperature differential exists therebetween.

When the windowed shell 40 constitutes part of a vacuum enclosure containing a rarefied gas, the gas molecules which strike the surface 41 are raised in temperature and hence in thermal energy level and strike the vane 37 as they move radially out through the vane opening in the cylinder wall toward the lower temperature thermally conductive shell 40. The molecules impinging upon the vane 37 generate radiometer forces thereon which produce counterclockwise rotation of the cylinder 36 as viewed in FIGURE 2.

As best seen in FIGURE 4, the cylinder 36 is supported from the ferrite rod 12 by fine suspension wires 42 which may be of quartz, and rotation of the cylinder 36 is held between fixed limits by means of the vertical pin 43 which is secured to the upper end of the ferrite rod 12 and disposed between the arms of a fork 44 secured to a fixed part of the structure. The outside surface of the cylinder 36 upon which radiation may be directed from the light source 45 controllable by the device 18 is provided with a radiation absorbing coating of the type previously described for the absorbent coating 11 of the disc 10 in FIGURE 1.

The structure is observed to be so arranged that radiation from the source 45 falls upon only one quadrant of the surface of cylinder 36, the particular quadrant being that upon which the radiation produces a clockwise torque. It is this clockwise torque which opposes the counterclockwise radiometer torque developed by molecular bombardment of the cylindrical vane 37 due to the temperature differential established between the differentially heated surfaces 41 and 40. It can be shown that the torque on the cylinder 36 developed by radiation falling on one quadrant thereof is given by the following expression:

$$\tau_c = \frac{r^2 h}{2} Pc(R_A + R_D) \qquad (3)$$

Where $\tau_c$ is the control torque on the cylinder.
$Pc$ is the radiation pressure exerted by the radiation from light source 45, and is equal to $S/c$.
$r$ is the outside radius of cylinder 36.
$h$ is the height of the cylinder.
$R_A$ is the coefficient of absorption and
$R_D$ is the coefficient of diffuse reflection.

The cylindrical configuration of the sensor is responsive only to radiation from the light source 45 and is not affected by radiometer forces within the shell 40 which might be exerted upon the surface of the cylinder by the molecules of the rarefied gas within the enclosure. This occurs because radiometer forces are always normal to the surface of impingement, and hence the line of action of such forces will always pass through the center of rotation of the cylinder 36 and cannot produce a rotative force or torque. While a single vane 37 is illustrated as being turned out of the side wall of the cylinder 36, the size, number and inclination of the radiometer vanes may be chosen to depend upon the desired level of radiometer torque.

The operation of the circuitry of FIGURE 2 is exactly the same as that already described in connection with the showing of FIGURE 1. The only difference being in the sensor devices. It will of course be appreciated that in general the disc type of sensor in FIGURE 1 will also be housed within an enclosure in order to eliminate the effect of any extraneous forces on the target 13 and limit the force to that which it is desired to measure.

Turning now to FIGURE 3, there is illustrated an apparatus for magnetically suspending a desired configuration of sensor. The sensor may be that shown in FIGURE 1 as a disc type structure, or may be the cylindrical vaned radiometer device shown in FIGURE 2 or any other type of suitable sensing device such as is shown in yet a third form in the specific illustration of FIGURE 3. The sensor of FIGURE 3 is basically a composite of those shown in FIGURES 1 and 2 in that it employs a target 46 similar to the target 13 in FIGURE 1, while utilizing a cylindrical radiation pressure controlled surface 47 to produce the control torque for balancing the torque generated by forces to be measured acting upon the target 46. As in the previously described cases the sensor is secured to an axially vertically extending ferrite rod, designated in FIGURE 3 as 48, to the upper end of which is secured to a mirror 49, the ferrite rod 48 and mirror 49 corresponding of course to the previously described ferrite rods 12 and mirrors 15. Similarly, the sensor structure is enclosed within a housing 50 having a window 51 therethrough through which radiation from the light source 52 is directed onto the cylinder 47.

Most of the weight of the sensor is due to the ferrite rod which provides in conjunction with the suspension coil 53 a magnetic suspension for the sensor device. The vertical position of the ferrite rod, and hence of the sensor assembly, is sensed by the vertical sensing coil 54 which generates a signal in accordance with the vertical position of the ferrite rod. The signal developed by the sensing coil 54 is fed to the vertical servo circuitry 55 which in turn adjusts the energization of the magnetic suspension coil 53 to maintain the ferrite rod and sensor assembly at a predetermined desired height.

Figure 5:
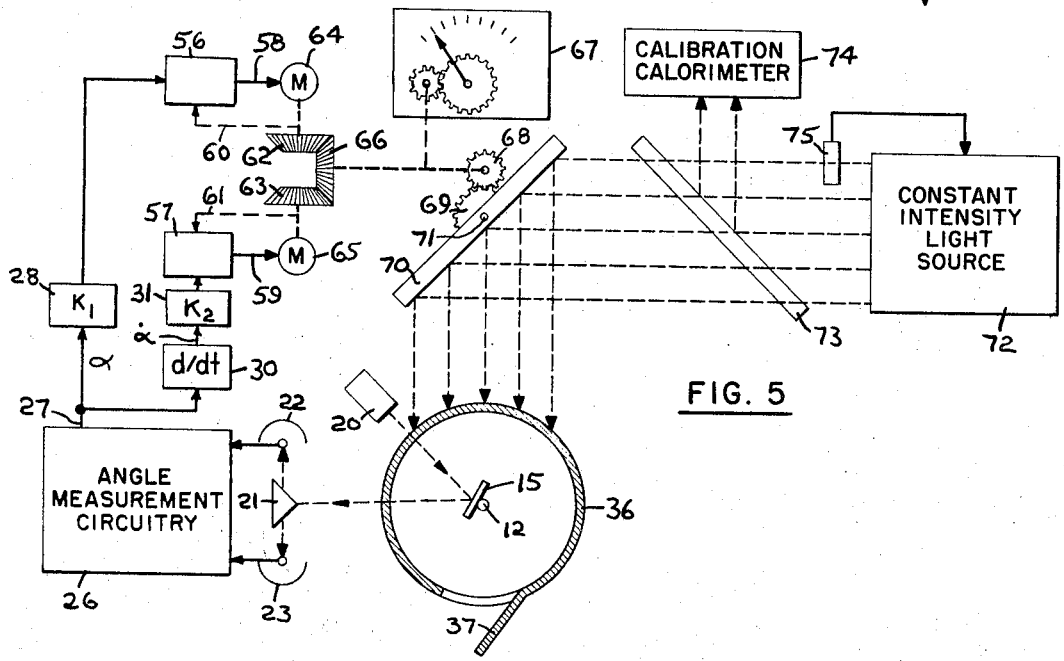
FIGURE 5 illustrates apparatus for providing a differential control torque to the gauge sensor element from a single constant intensity light source.

Turn now to the showing of FIGURE 5 which illustrates a somewhat different mechanization from those previously described. In FIGURE 5 it is observed that the sensor itself is exactly the same as that illustrated in the showing of FIGURE 2, namely the cylindrical radiometer type of structure. Similarly, the angular rotation monitoring apparatus is the same and includes the collimated light source 20, mirror 15, beam splitter 21, photocells 22 and 23 with the associated output leads feeding the angle measurement circuitry 26, the scaling devices 28 and 31 and differentiator 30. The outputs of the scaling devices 28 and 31 which are respectively proportional to the angular deviation $\alpha$ and the rate of change of angular deviation $\dot{\alpha}$ feed respectively into control devices 56 and 57.

These control devices 56 and 57 are basically balancing networks which generate outputs on their respective output lines 58 and 59 corresponding to the difference between the input signals. The control device 56 is provided with a second signal input circuit 60 while the control device 57 is provided with a second signal input 61, the signal inputs 60 and 61 being mechanically derived from the shafts of the differential gears 62 and 63 which latter are respectively driven by the motors 64 and 65. The magnitudes of the signal inputs 60 and 61 correspond directly to the angular rotation of their associated differential gears 62 and 63.

Thus, assuming that the system is initially at a condition of $\alpha$ equals zero, the signal inputs 60 and 61 are established at a reference level of zero. When now the sensor is set into motion so that an angle $\alpha$ is derived, the signal $K_1\alpha$ injected into the control device 56 is opposed by a zero input signal 60 and therefore drives through to the output line 58 to drive motor 64 and therefore rotate the differential gear 62 and of course drive the differential output gear 66. The rotation of the differential gear 62 injects a bucking signal proportional to rotation into the control device 56 via signal input 60 to therefore decrease the motor driving signal on output line 58. Motor 64 slows down but continues to rotate until the signal injected at 60 derived from differential gear 62 has increased to a value equal to $K_1\alpha$ to thereby decrease the motor driving signal on output line 58 to zero and stop the motor. Exactly the same thing occurs in the $K_2\alpha$ circuit.

The rotation of the differential output gear 66 is coupled to a scaled output indicator 67 and also drives a gearing system 68–69 effective to rotate a mirror 70 about a central pivotal axis 71. Rotation of the mirror 70 shifts the radiation form constant intensity light source 72 so that more radiation is thrown upon one quadrant of the cylinder 36 while less radiation is reflected to the other quadrant. A net radiation pressure controlled torque is thus exerted on the cylinder 36 which opposes the torque produced by radiometer force and eventually stabilizes at a deviation $\alpha$ corresponding to the force or pressure being measured. A beam splitter 73 is utilized to direct some of the light from the source 72 to a calibrator 74 for purposes of calibration. A photocell pickup 75 may also be used to monitor the intensity of the light source 72 and generate a feedback signal effective to maintain constant the light source intensity.

While FIGURES 1, 2 and 5 illustrate different methods of controlling the radiation input to the sensor device for purposes of generating the control torque by means of which the unknown force or pressure may be measured, other alternatives are also possible. For example, optical filtering may be utilized or the relative orientation of two polarizing surfaces. Similarly, a shiftable shutter could be used in the structure of FIGURE 2 in conjunction with a radiation beam covering an entire half of the control cylinder, control being exerted by shifting the shutter to block radiation from one quadrant or the other of the cylinder surface and in varying degress so as also to produce a differential torque effect.

While the various embodiments illustrated show ferrite rods, such as 12 and 48, used in conjunction with other apparatus to provide a magnetic suspension for the sensor, it will be appreciated that means other than the ferrite rod could be as well employed, as for example in the embodiment of FIGURE 1 by making the disc 10 of material suitable for magnetic suspension. Moreover, as relates to the dual light sources 16 and 17 of FIGURE 1 and the differential intensity control thereof, it will be also appreciated that a single one of the shown light sources could be used by controlling the light intensity thereof. Additionally, a manually controlled signal on line 19 could be utilized in place of the signals generated automatically in response to angular deviation of the sensor. Such manual control could be used to return the sensor to an angular deviation of zero as measured by the angle measurement circuitry. Finally, it will be noted from Equations 1, 2 and 3 that the generated control torque varies linearly with the sum of the coefficients of absorption and diffuse reflection.

Accordingly, the invention is not to be considered as limited in application only to a radiation receiving surface which is highly absorbent since maximum torque may as readily be achieved with a surface having a high coefficient of diffuse reflection or one having a high composite coefficient.

Having now described my invention in connection with particularly illustrated embodiments thereof it will be appreciated that variations and modifications of my invention may now occur from time to time to those persons normally skilled in the art without departing from the essential scope or spirit of the invention, and accordingly it is intended to claim the same broadly as well as specifically as indicated by the appended claims.

What is claimed as new and useful is:

1. Apparatus for measuring very small forces, comprising in combination,
   (1) a senor device rotatable about a fixed position axis of rotation and including,
      (a) a sensor support element through which passes the rotational axis of said sensor,
      (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and
      (c) a radiation receiving surface carried by said sensor support element, disposed laterally of said axis of rotation and upon which surface radiation is selectively directable to produce a torque tending to rotate said sensor about said axis of rotation in a second sense opposite to said first sense,
   (2) means for freely suspending said sensor by its support element for rotation about said fixed position axis,
   (3) control signal generating monitor means effective to detect angular deviations of said sensor from a predetermined reference position and generate control signals uniquely corresponding to said angular deviation and to the rate of change thereof,
   (4) radiation projecting means disposed for projecting radiation onto the said radiation receiving surface of said sensor, and
   (5) control means coupled to said monitor means and to said radiation projecting means automatically effective responsive to the control signals generated by said monitor means to control the quanta of radiation projected onto said sensor to thereby produce a torque on said sensor equal and opposite to that produced by the force being measured,
whereby, the rotation of said sensor is stopped at an angular deviation from its aforesaid predetermined reference position which uniquely corresponds to the magnitude of the force being measured.

2. Apparatus for measuring very small forces, comprising in combination,
   (1) a sensor device rotatable about a fixed position axis of rotation and including,
      (a) a sensor support element through which passes the rotational axis of said sensor,
      (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and
      (c) a radiation receiving surface carried by said sensor support element, disposed laterally of said axis of rotation and upon which surface radiation is selectively directable to produce a torque tending to rotate said sensor about said axis of rotation in a second sense opposite to said first sense,
   (2) means for suspending said sensor by its support element for rotation about said fixed position axis,
   (3) control signal generating monitor means effective to detect angular deviations of said sensor from a predetermined reference position and generate control signals uniquely corresponding to said angular deviation,
   (4) radiation projecting means disposed for projecting radiation onto the said radiation receiving surface of said sensor, and
   (5) control means coupled to said monitor means and to said radiation projecting means effective responsive to the control signals generated by said monitor means to control the quanta of radiation projected onto said sensor to thereby produce a torque on said sensor equal and opposite to that produced by the force being measured.

3. The apparatus as set forth in claim 2 wherein said sensor support element is a ferrite rod, and said sensor suppending means is a magnetic suspension coil electromagnetically coupled to said ferrite rod by an electromagnetic field of sufficient strength to suspend said sensor for rotation about the longitudinal axis of said rod.

4. The apparatus as set forth in claim 2 wherein said control signal generating monitor means comprises,
  (1) light reflecting means fixedly secured to said sensor support element and rotatable therewith as said sensor is rotated,
  (2) a narrow beam collimated light source positioned to direct its beam at an angle upon said light reflecting means for reflection therefrom,
  (3) light beam dividing means positioned to receive the light beam reflected from said reflecting means, divide said beam into two subsidiary beams, and reflect the subsidiary beams in different directions, said dividing means being so positioned relative to said sensor that said subsidiary beams are of equal intensity when said sensor is at a predetermined reference position, and change in intensity relative to each other as said sensor rotates in either direction away from said reference position.
  (4) a pair of photoresponsive devices positioned to be each illuminated by a different one of said subsidiary beams and to produce output signals in accordance with the intensity of the beams, and
  (5) control signal generating means coupled to said photoresponsive devices and responsive to the output signals thereof including means effective to generate a composite control signal having
    (a) a first component directly proportional to the difference between the intensities of said subsidiary light beams which is therefore proportional to the angular deviation of said sensor from its aforesaid predetermined reference position, and
    (b) a second component proportional to the rate of change of said first component and which is therefore proportional to the angular rate of said sensor.

5. The apparatus as set forth in claim 2 further including
  (1) a pair of differentially heated surfaces each respectively being in non-engaging apposition to a different one of the opposite faces of said target element,
  (2) a housing completely enclosing said sensor to provide a controlled atmosphere therewithin to effect radiometer bombardment of said target only by the molecules within said housing.

6. The apparatus as set forth in claim 2 wherein said control signal generating monitor means comprises,
  (1) light reflecting means fixedly secured to said sensor support element and rotable therewith as said sensor is rotated,
  (2) a narrow beam collimated light source positioned to direct its beam at an angle upon said light reflecting means for reflection therefrom,
  (3) light beam dividing means positioned to receive the light beam reflected from said reflecting means, divide said beam into two subsidiary beams, and reflect the subsidiary beams in different directions, said dividing means being so positioned relative to said sensor that said subsidiary beams are of equal intensity when said sensor is at a predetermined reference position, and change in intensity relative to each other as said sensor rotates in either direction away from said reference position,
  (4) a pair of photoresponsive devices positioned to be each illuminated by a different one of said subsidiary beams and to produce output signals in accordance with the intensity of the beams, and
  (5) control signal generating means coupled to said photoresponsive devices and responsive to the output signals thereof effective to generate a control signal directly proportional to the difference between the intensities of said subsidiary light beams, and which control signal is hence proportional to the angular deviation of said sensor from its aforesaid predetermined reference position.

7. The apparatus as set forth in claim 6 wherein said radiation receiving surface is a flat planar surface disposed orthogonally to, and through which passes, the said axis of rotation.

8. The apparatus as set forth in claim 6 wherein said radiation receiving surface is of cylindrical curvature having a cylindrical axis coincident with the said axis of rotation.

9. Apparatus for measuring very small forces, comprising in combination,
  (1) a sensor device rotatable about a fixed position axis of rotation and including,
    (a) a sensor support element through which passes the rotational axis of said sensor,
    (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and
    (c) a radiation absorbent flat planar surface carried by said sensor support element, disposed orthogonally to, and through which passes, the said axis of rotation and upon which surface off-axis radiation is selectively directable to produce a torque tending to rotate said sensor about said axis of rotation in a second sense opposite to said first sense,
  (2) means for suspending said sensor by its support element for rotation about said fixed position axis,
  (3) control signal generating monitor means effective to detect angular deviations of said sensor from a predetermined reference position and generate control signals uniquely corresponding to said angular deviation,
  (4) radiation projecting means disposed for projecting radiation onto the said radiation absorbent surface of said sensor, and
  (5) control means coupled to said monitor means and to said radiation projecting means effective responsive to the control signals generated by said monitor means to control the quanta of radiation projected onto said sensor to thereby produce a torque on said sensor equal and opposite to that produced by the force being measured.

10. Apparatus for measuring very small forces, comprising in combination,
  (1) a sensor device rotatable about a fixed position axis of rotation and including,
    (a) a sensor support element through which passes the rotational axis of said sensor,
    (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and
    (c) a radiation absorbent surface of cylindrical curvature carried by said sensor support element whose cylindrical axis is coincident with the said axis of rotation and upon which surface radiation is selectively directable to produce a torque tending to rotate said sensor about said axis of rotation in a second sense opposite to said first sense,
  (2) means for suspending said sensor by its support element for rotation about said fixed position axis, (3) control signal generating monitor means effective to detect angular deviations of said sensor from a predetermined reference position and generate control signals uniquely corresponding to said angular deviation, (4) radiation projecting means disposed for projecting radiation onto the said radiation absorbent surface of said sensor, and (5) control means coupled to said monitor means and to said radiation projecting means effective responsive to the control signals generated by said monitor means to control the quanta of radiation projected onto said sensor to thereby produce a torque on said sensor equal and opposite to that produced by the force being measured.

11. The apparatus as set forth in claim 10 further including (1) a pair of differentially heated surfaces each respectively being in non-engaging apposition to a different one of the opposite faces of said target element, (2) a housing completely enclosing said sensor to provide a controlled atmosphere therewithin to effect radiometer bombardment of said target only by the molecules within said housing.

12. The apparatus as set forth in claim 11 wherein said control signal generating monitor means comprises, (1) light reflecting means fixedly secured to said sensor support element and rotatable therewith as said sensor is rotated, (2) a narrow beam collimated light source positioned to direct its beam at an angle upon said light reflecting means for reflection therefrom, (3) light beam dividing means positioned to receive the light beam reflected from said reflecting means, divide said beam into two subsidiary beams, and reflect the subsidiary beams in different directions, said dividing means being so positioned relative to said sensor that said subsidiary beams are of equal intensity when said sensor is at a predetermined reference position, and change in intensity relative to each other as said sensor rotates in either direction away from said reference position, (4) a pair of photoresponsive devices positioned to be each illuminated by a different one of said subsidiary beams and to produce output signals in accordance with the intensity of the beams, and (5) control signal generating means coupled to said photoresponsive devices and responsive to the output signals thereof including means effective to generate a composite control signal having (a) a first component directly proportional to the difference between the intensities of said subsidiary light beams which is therefore proportional to the angular deviation of said sensor from its aforesaid predetermined reference position, and (b) a second component proportional to the rate of change of said first component and which is therefore proportional to the angular rate of said sensor.

13. Apparatus for measuring very small forces, comprising in combination, (1) a sensor device rotatable about a fixed position axis of rotation and including, (a) a sensor support element through which passes the rotational axis of said sensor, (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and (c) radiation receiving surface carried by said sensor support element, disposed laterally of said axis of rotation and upon which surface radiation is selectively directable to produce a torque tending to rotate said sensor about said axis of rotation in a second sense opposite to said first sense, (2) means for suspending said sensor by its support element for rotation about said fixed postion axis, (3) control signal generating monitor means effective to detect angular deviations of said sensor from a predetermined reference position and generate control signals uniquely corresponding to said angular deviation, (4) variable intensity radiation projecting means disposed for projecting radiation onto the said radiation receiving surface of said sensor, and (5) control means coupled to said monitor means and to said variable intensity radiation projecting means effective responsive to the control signals generated by said monitor means to vary the intensity of radiation projected onto said sensor to thereby change the torque on said sensor to one which is equal and opposite to that produced by the force being measured.

14. Apparatus for measuring very small forces, comprising in combination, (1) a sensor device rotatable about a fixed position axis of rotation and including, (a) a sensor support element through which passes the rotational axis of said sensor, (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and (c) a radiation receiving surface carried by said sensor support element and extending laterally of said axis of rotation in opposite directions, and upon which surface off-axis radiation is selectively directable to produce a pair of counteracting torques on said sensor tending to rotate the latter in opposite senses about said axis of rotation, (2) means for suspending said sensor by its support element for rotation about said fixed position axis, (3) control signal generating monitor means effective to detect angular deviations of said sensor from a predetermined reference postion and generate control signals uniquely corresponding to said angular deviation, (4) radiation projecting means disposed for projecting radiation onto the said radiation receiving surface of said sensor effective to produce a pair of normally offsetting counteracting torques thereon tending to rotate the sensor in opposite directions, and (5) control means coupled to said monitor means and to said radiation projecting means effective responsive to the control signals generated by said monitor means to differentially control the quanta of radiation projected onto said sensor to thereby produce a torque on said sensor equal and opposite to that produced by the force being measured.

15. The apparatus as set forth in claim 14 wherein said radiation receiving surface is a flat planar surface disposed orthogonally to, and through which passes, the said axis of rotation.

16. The apparatus as set forth in claim 14 wherein said radiation receiving surface is of cylindrical curvature having a cylindrical axis coincident with the said axis of rotation.

17. Apparatus for measuring very small forces, comprising in combination, (1) a sensor device rotatable about a fixed position axis of rotation and including,
   (a) a sensor support element through which passes the rotational axis of said sensor,
   (b) a target element fixedly secured to said sensor support element and upon which the force to be measured may be directed, said target element extending laterally of said axis of rotation so that a force exerted thereon produces a torque tending to rotate said sensor in a first sense about said axis of rotation, and
   (c) a radiation receiving surface carried by said sensor support element and extending laterally of said axis of rotation in opposite directions, and upon which surface off-axis radiation is selectively directable to produce a pair of counteracting torques on said sensor tending to rotate the latter in opposite senses about said axis of rotation,
(2) means for suspending said sensor by its support element for rotation about said fixed position axis,
(3) control signal generating monitor means effective to detect angular deviations of said sensor from a predetermined reference position and generate control signals uniquely corresponding to said angular deviation,
(4) constant intensity radiation projecting means disposed for projecting radiation onto the said radiation receiving surface of said sensor effective to produce a pair of normally off-setting counteracting torques thereon tending to rotate the sensor in opposite directions, and
(5) control means coupled to said monitor means and to said radiation projecting means effective responsive to the control signals generated by said monitor means to alter the direction of the said constant intensity radiation to cause more radiation to strike said radiation receiving surface on one side of the rotational axis than on the other and to thereby produce a net torque on said sensor tending to rotate the latter in opposite sense to that produced by the force being measured.

18. The apparatus as set forth in claim 17 wherein said control signal generating monitor means comprises,
   (1) light reflecting means fixedly secured to said sensor support element and rotatable therewith as said sensor is rotated,
   (2) a narrow beam collimated light source positioned to direct its beam at an angle upon said light reflecting means for reflection therefrom,
   (3) light beam dividing means positioned to receive the light beam reflected from said reflecting means, divide said beam into two subsidiary beams, and reflect the subsidiary beams in different directions, said dividing means being so positioned relative to said sensor that said subsidiary beams are of equal intensity when said sensor is at a predetermined reference position, and change in intensity relative to each other as said sensor rotates in either direction away from said reference position,
   (4) a pair of photoresponsive devices positioned to be each illuminated by a different one of said subsidiary beams and to produce output signals in accordance with the intensity of the beams, and
   (5) control signal generating means coupled to said photoresponsive devices and responsive to the output signals thereof effective to generate a control signal directly proportional to the difference between the intensities of said subsidiary light beams, and which control signal is hence proportional to the angular deviation of said sensor from its aforesaid predetermined reference position.

No references cited.

RALPH G. NILSON, *Primary Examiner.*

J. D. WALL, *Assistant Examiner.*